United States Patent [19]
Brosens

[11] Patent Number: 5,521,740
[45] Date of Patent: May 28, 1996

[54] RESONANT OPTICAL SCANNER

[75] Inventor: Pierre J. Brosens, Belmont, Mass.

[73] Assignee: General Scanning, Inc., Watertown, Mass.

[21] Appl. No.: 500,777

[22] Filed: Jul. 11, 1995

[51] Int. Cl.[6] .................................................. G02B 26/08
[52] U.S. Cl. .......................... 359/224; 359/199; 359/213; 359/214
[58] Field of Search ..................................... 359/196, 198, 359/199, 212–214, 223, 224; 348/203, 205; 464/170; 310/36; 358/474; 250/234

[56] References Cited

U.S. PATENT DOCUMENTS 5,247,384  9/1993  Inoue et al. ............................. 359/199

*Primary Examiner*—James Phan
*Attorney, Agent, or Firm*—Cesari and McKenna

[57] ABSTRACT

Leaf springs suspend a frame within an outer housing of a resonant optical scanner. The leaf springs are substantially perpendicular to the axis of torsional oscillation and to the direction of transverse oscillation of the rotor and, therefore, reduce the transmission of vibrational forces from the scanner to an optical bed.

4 Claims, 2 Drawing Sheets

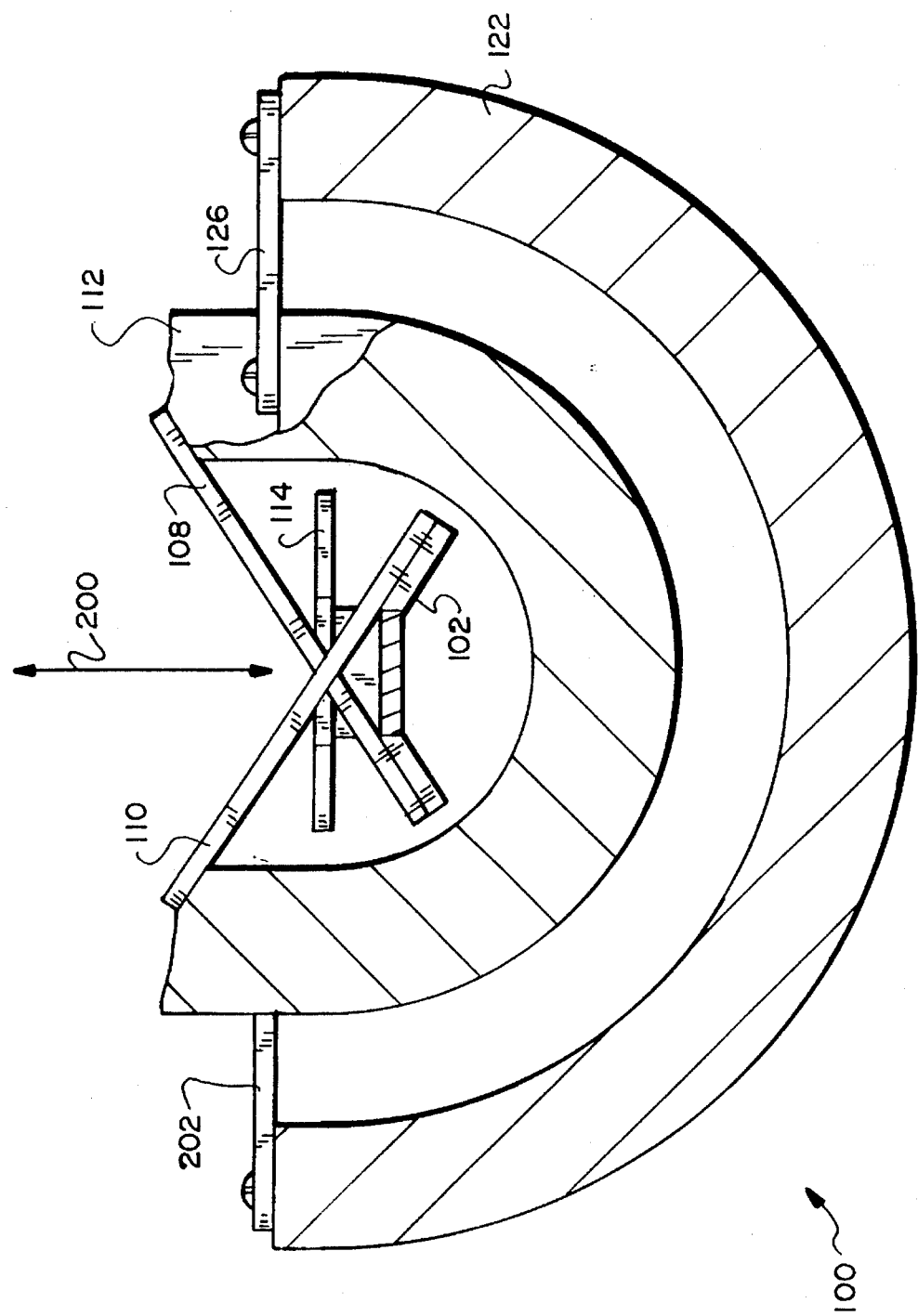

RESONANT OPTICAL SCANNER

FIELD OF THE INVENTION

The invention relates to a resonant optical scanner, and in particular to a structure that reduces the transmission of vibrational forces from the scanner to an optical bed.

BACKGROUND OF THE INVENTION

A resonant optical scanner torsionally oscillates a mirror to repeatedly deflect a beam of light across an optical field. The light beam may originate from, e.g., a laser or a localized area of a source document being scanned. The scanner typically comprises a torsionally resonant rotor and a mirror attached to the rotor for oscillation therewith. Flexures, typically springy flat metal strips, attach the rotor to a frame. The rotor and flexures define a single-degree-of-freedom, resonant mechanical oscillator that is driven at its resonant frequency by a limited-rotation motor. The frame is attached to an optical bed, which typically also supports the optical source and target.

Resonant scanners have a relatively long life and can move a mirror as large as 1.5 in. in diameter at a frequency on the order of 200 Hz. Only more expensive rotating polygon scanners can match these mechanical capabilities. A resonant scanner advantageously uses a single reflective surface and, therefore, avoids the beam jitter associated with facet alignment errors in rotating polygon scanners. A resonant scanner can, therefore, provide accurate overlapping successive scans. However, and quite problematically, vibrational forces induced by the oscillations of the rotor limit the accuracy of the successive scans. Two types of vibrational forces can deform the optical bed and introduce optical errors.

Reaction torque from the torsional oscillations of the rotor create the first set of vibrational forces. The flexures must be sufficiently stiff to achieve a desired oscillation frequency, however such stiff flexures transmit the reaction torque to the frame. In prior art resonant scanners, the frame is rigidly mounted to the optical bed and all the reaction torque is transmitted to the optical bed. A typical rotor having an inertia of 10 g-cm$^2$ and oscillating at 200 Hz with an amplitude of 15 degrees requires an excitation torque of about 3.5 in-lbf. This excitation is not severe because most optical beds are extremely rigid with respect to the local application of a torque having a vector perpendicular to the bed.

The rotor translates transversely each time the flexures deflect and these translations create the second, and more problematic, set of vibrational forces. As the rotor torsionally translates from its rest position toward one of its extreme positions, the flexures deflect and the straight-line distance between their respective ends decreases, i.e., the flexures become effectively shorter. As the rotor torsionally returns to its rest position, the flexures return to their undeflected state and effectively becomes longer again. As the rotor torsionally translates from its rest position toward its other extreme position, the flexures again deflect and become effectively shorter. Thus, the effective length of the flexures changes at twice the frequency that the rotor torsionally oscillates. These oscillatory changes in the effective length of the flexures cause the rotor to oscillate transversely with respect to the frame. In a typical resonant scanner with 0.84 in. long flexures, the rotor translates 0.0067 in. transversely when it deflects 15 degrees from its rest position. A typical rotor oscillating at 200 Hz. produces a transverse oscillation force of about 6.6 lb. at 400 Hz. This force can dynamically deform the optical bed and often produces an objectionable audible noise.

Prior art designers have attempted to reduce the transmission of the oscillatory forces by inserting vibration isolation pads between the frame and the optical bed. These pads are unsatisfactory because the forces involved have different lines of action and produce an oscillatory torque. A pad structure that reduces all these forces is mechanically complex, expensive, and limited in effectiveness.

It is, therefore, an objective of the present invention to provide a resonant optical scanner that imparts very low levels of vibrational forces to an optical bed.

Other objectives will, in part, be obvious and will, in part, appear hereinafter. The invention accordingly comprises an article of manufacture possessing the features and properties exemplified in the constructions described herein and the several steps and the relation of one or more of such steps with respect to the others and the apparatus embodying the features of construction, combination of elements and the arrangement of parts which are adapted to effect such steps, all as exemplified in the following detailed description, and the scope of the invention will be indicated in the claims.

SUMMARY OF THE INVENTION

The present invention utilizes leaf springs to suspend the frame of a resonant scanner within an outer housing to reduce the transmission of vibrational forces from the scanner to an optical bed. The leaf springs are oriented perpendicular to, and therefore provide maximum compliance in, the direction of motion induced by the vibrational forces. The leaf springs allow the frame to oscillate torsionally and transversely relative to the fixed housing. The leaf springs, therefore, isolate the housing from the vibrational forces and the housing can be rigidly mounted to an optical bed without imparting an undesirable level of vibration to the optical bed. The rotor, flexures, frame and leaf springs define a two-degree-of-freedom torsional mechanical oscillator that can be driven at either of its two resonant frequencies by the motor. The system should be driven at the higher of the two frequencies because driving it at the lower frequency actually increases the transmission of vibrational forces to the optical bed.

The leaf springs allow the frame to rotate in response to the reaction torque generated by the torsional oscillations of the rotor. The rotor and frame counteroscillate and the amplitude of the angular oscillations of the frame bears approximately the same ratio to the amplitude of the rotor oscillations as the rotor inertia bears to the frame inertia. A typical rotor-to-frame inertia ratio is 1:150. The leaf springs deflect, therefore, only a small amount to accommodate the angular oscillations of the frame. The frame should have a relatively high inertia so the leaf springs can be relatively rigid, which in turn prevents them from negatively impacting the alignment of the optical system.

The leaf springs also allow the frame to translate in response to the oscillatory translations of the rotor's center of gravity. Effectively, the leaf springs allow the ends of the flexures that are attached to the frame to translate. The forces required to dynamically accelerate the frame and the rotor mostly balance each other. The amplitude of the residual translation force bears approximately the same ratio to the amplitude of the translation forces of the rotor in a conventional scanner as the rotor mass bears to the frame mass. A typical rotor-to-frame mass ratio is 1:15.

BRIEF DESCRIPTION OF THE DRAWINGS

The above and further advantages of the invention may be better understood by referring to the following detailed description in conjunction with the accompanying drawings in which:

FIG. 2 is a cross-section view of the scanner of FIG. 1.

DETAILED DESCRIPTION OF THE PREFERRED EMBODIMENT

Figure 1:
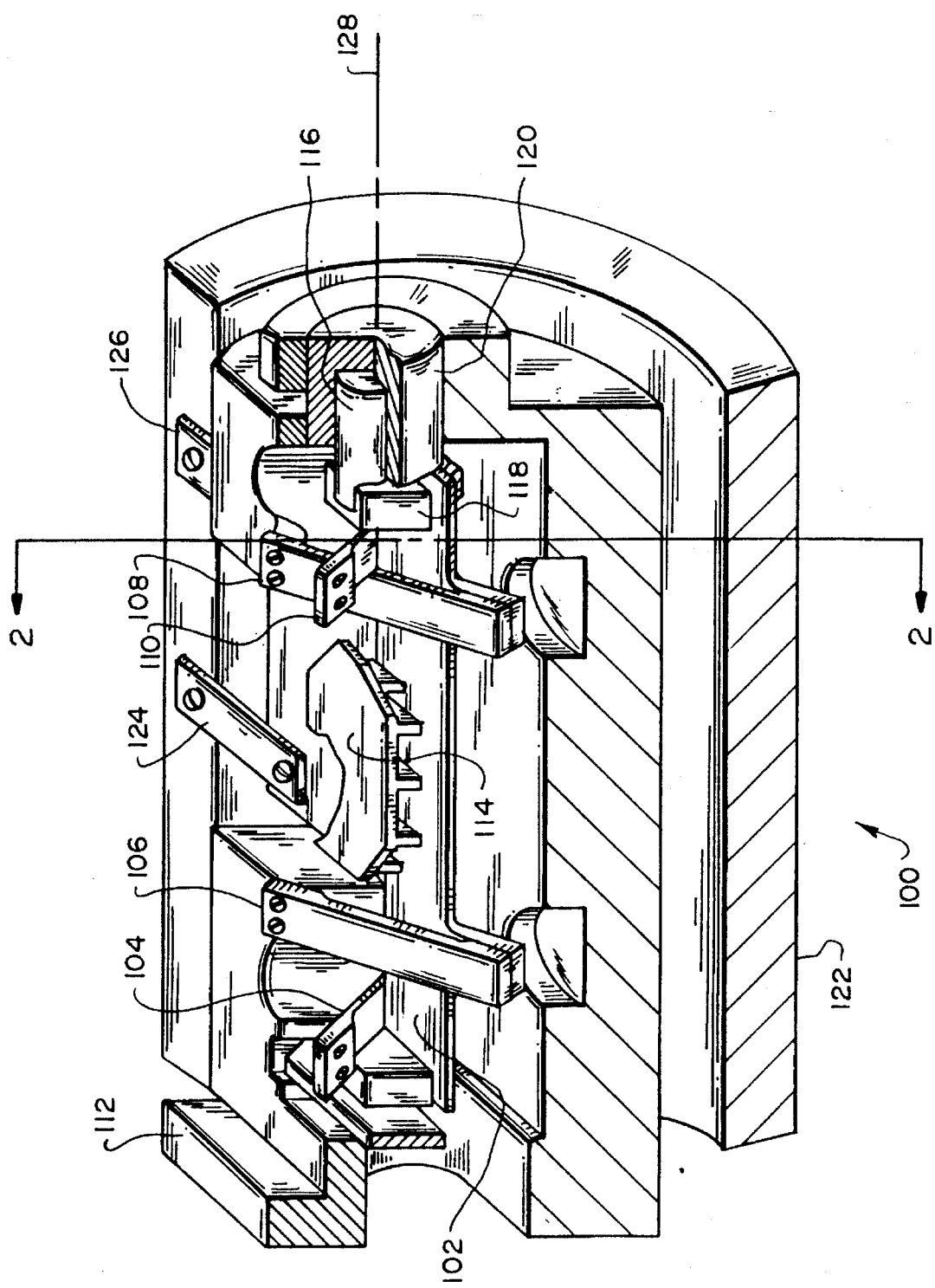
FIG. 1 is a perspective cut-away view of a resonant optical scanner according to the present invention.

The cutaway view of a rotor in FIG. 1 shows generally at 100 an optical scanner having a rotor 102 suspended by flexures 104, 106, 108 and 110 within a frame 112, and a mirror 114 attached to the rotor 102 for torsional oscillation therewith. A permanent magnet 116 is attached to the rotor 102 by means of a fixing member 118. The rotor 102, mirror 114, permanent magnet 116 and fixing member 118 collectively constitute a movable section. The movable section, the flexures 104–110 and leaf springs (described below) form a mechanical oscillatory system having two resonant frequencies. This oscillatory system is driven to the higher of its two natural frequencies of torsional resonance by a coil assembly 120 and an external drive circuit (not shown). The drive circuit delivers alternating electrical current to the coil 120 such as to increase the oscillating amplitude of the mechanical oscillatory system until it reaches a desired amplitude. The frame 112 is suspended within a housing 122 by leaf springs 124, 126 and two additional leaf springs not shown in FIG. 1. The rotor 102 torsionally oscillates about an axis of torsional oscillation 128. The leaf springs 124, 126 and the two leaf springs not shown in FIG. 1, are substantially perpendicular to the axis of torsional oscillation 128.

FIG. 2 shows a cross-section of the resonant optical scanner 100. As the rotor 102 torsionally oscillates, the effective length of the flexures 104–110 changes and the rotor translates longitudinally along a direction of translation 200, as described above. The leaf springs 126, 202 and the two leaf springs not shown in FIG. 2, are substantially perpendicular to the direction of translation 200.

Several considerations and formulae help determine the appropriate values for the design parameters for the various components of the optical scanner. Table 1 lists the known or desired input variables and typical values for these variables. For example, the "design resonant frequency," i.e. the frequency of torsional oscillation of the rotor and mirror, is usually dictated by other aspects of the system of which the resonant optical scanner is a part. As a further example, although the preferred embodiment shown in FIGS. 1 and 2 employs only one leaf spring at each support point, multiple leaf springs can be stacked together at each support point. In either case, their number is reflected in the "number of leaf springs stacked at each point of frame suspension." Using formulae that appear after Table 1, various parameters of the optical scanner can be calculated from the design input variables listed in the table. Acceptable values for the design input variables can then be determined by varying one or more of the variables, thus altering the calculated parameters, until the values of certain parameters reach desired values. The desired values are described below as "considerations."

TABLE 1

| Variable Name | Unit | Design Input | Description |
|---|---|---|---|
| f | Hz | 158 | Design resonant frequency |
| $J_{rotor}$ | g-cm² | 10.6 | Rotor angular inertia |
| $J_{mirror}$ | g-cm² | 9.0 | Mirror angular inertia |
| $J_f$ | g-cm² | 1930 | Frame angular inertia |
| $M_{rotor}$ | g | 27.1 | Mass of rotor, without mirror |
| $M_{mirror}$ | g | 9.7 | Mass of mirror |
| $M_f$ | g | 510 | Mass of frame |
| φ | deg | 24 | Peak-to-peak mechanical amplitude of rotor |
| $K_{flex}$ | N-m/r | 2.2 | Angular stiffness contributed by the flexures supporting the rotor |
| $X_{bif}$ | in | 0.0043 | Mirror displacement perpendicular to its surface, imposed by the flexures as they deflect by angle φ |
| $L_{ls}$ | in | 0.450 | Effective span of leaf springs |
| $W_{ls}$ | in | 0.180 | Width of leaf springs |
| $t_{ls}$ | in | 0.012 | Thickness of leaf springs |
| $N_f$ | | 2 | Number of leaf springs stacked at each point of frame suspension |
| $R_{ls}$ | in | 0.630 | Radial position of inner leaf spring attachment points |
| $E_{ls}$ | psi | 29.4 × 10⁶ | Young's modulus of leaf spring |

Various parameters of the resonant optical scanner can be calculated from the design input variables and the following formulae. The subscripts "1" and "2" refer, respectively, to the first (lower) and second (higher) of the two resonant frequencies at which the system can be driven. The stiffness of each leaf spring is:

$$K_{ls} = 2E_{ls}W_{ls}N_f \left( \frac{t_{ls}}{L_{ls}} \right)^3 \quad (1)$$

The transverse dynamic deflection of the springs is:

$$X_{ls} = X_{bif} \frac{M_{rotor} + M_{mirror}}{M_{rotor} + M_{mirror} + M_f - \frac{K_{ls}}{(2\pi f)^2}} \quad (2)$$

The force transmission factor is:

$$F_{fs} = \frac{K_{ls}}{((2\pi f)^2 - K_{ls})(M_{rotor} + M_{mirror} + M_f)} \quad (3)$$

The quadratic parameters for the torsional modes are:

$$C_{ls} = K_{ls}R_{ls}^2 \quad (4)$$
$$a_f = J_f(J_{rotor} + J_{mirror}) \quad (5)$$
$$b_f = K_{flex}J_f + (K_{flex} + 4C_{ls})(J_{rotor} + J_{mirror}) \quad (6)$$
$$c_f = 4K_{flex}C_{ls} \quad (7)$$

The natural frequencies are:

$$\Omega_1 = \sqrt{\frac{b_f - \sqrt{b_f^2 - 4a_fc_f}}{2a_f}} \quad (8)$$

$$\Omega_2 = \sqrt{\frac{b_f + \sqrt{b_f^2 - 4a_fc_f}}{2a_f}} \quad (9)$$

$$f_{t1} = \frac{\Omega_1}{2\pi} \quad (10)$$

$$f_{t2} = \frac{\Omega_2}{2\pi} \quad (11)$$

The angular amplitude is:

$$\phi_2 = \phi \left(1 - \frac{(J_{rotor} + J_{mirror})\Omega_2^2}{K_{flex}}\right) \quad (12)$$

Torque transmission factor is:

$$T_{f2} = \frac{4C_{ls}\phi_2}{K_{flex}\phi} \quad (13)$$

The leaf spring deflection is:

$$\delta_2 4\phi_2 R_{ls} X_{ls} \quad (14)$$

The leaf spring stress is:

$$\sigma_2 = \frac{1.5 K_{ls} \delta_2 L_{ls}}{N_f W_{ls} t_{ls}^2} \quad (15)$$

These formulae can be used with the following considerations to arrive at appropriate values for the design variables of the various components of the optical scanner. Preferably, the rotor is driven at the higher of the two resonant frequencies, so $f_{f2} \sim f$. To reduce the transmission of vibrational forces, $F_{fs}$ should be minimized, i.e. $F_{fs} \ll 1$. Less importantly, $T_{f2}$ should also be minimized, i.e. $T_{f2} \ll 1$. Thus, the values of the design variables can be altered to meet the design requirements of the system of which the scanner is a part. Other design variables can then be altered to achieve the above-listed considerations. Table 2 lists example parameters calculated according to the above formulae and considerations. Some minor factors are omitted to simplify the analysis, which results in the accepted calculated value of $f_{f2}$ being higher than the design value.

TABLE 2

Example Calculated Design Parameters

| Variable Name | Unit | Calculated Value | Description |
|---|---|---|---|
| $K_{ls}$ | lbf/in | 401.4 | Clamped-clamped stiffness per spring |
| $C_{ls}$ | N-m/r | 18.00 | Torsional stiffness per spring |
| $X_{ls}$ | in | 0.0004 | Transverse leaf spring deflection |
| $F_{fs}$ | | 0.163 | Force transmission factor |
| $f_{t1}$ | Hz | 100.0 | First (lower) torsional resonant frequency |
| $f_{t2}$ | Hz | 176.3 | Second (higher) torsional resonant frequency |
| $\phi_2$ | deg | −0.4 | Angular amplitude at $f_{t2}$ |
| $T_{f2}$ | | −0.49 | Torque transmission factor at $f_{t2}$ |
| $\delta_2$ | in | −0.004 | Leaf spring deflection at $f_{t2}$ |
| $\sigma_2$ | psi | −18,965 | Leaf spring stress at $f_{t2}$ |
| $\Omega_1$ | r/s | 628.023 | First (lower) angular natural frequency |
| $\Omega_2$ | r/s | 1107.580 | Second (higher) angular natural frequency |
| $a_f$ | | 3.28 × 10⁻¹⁰ | Quadratic coefficient |
| $b_f$ | | 0.00053 | Quadratic coefficient |
| $c_f$ | | 159.152 | Quadratic coefficient |

For example, incorporating the design input variables of Table 1, if each leaf spring 124, 126, 202, and the leaf spring not shown in FIGS. 1 or 2, is 0.008–0.015 in. thick, 0.15 in. wide, and effectively 0.30 in. long, a typical torsional rotor amplitude of 15 degrees produces about 0.3 degrees of frame rotation, which deflects each leaf spring 0.006 in. Such a deflection results in 1 in-lbf., or 0.29 times the excitation torque found in a conventional scanner. The leaf springs reduce the transverse translation of the frame to about 0.00067 in., resulting in 0.9 lb. of transmitted force, or about 0.14 times the force found in a conventional scanner.

It will therefore be seen that I have developed an improved resonant optical scanner, which can be utilized with a variety of applications. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A resonant optical scanner, comprising:

(a) a housing;

(b) a plurality of leaf springs having first and second ends, the first end of each leaf spring being attached to the housing;

(c) a frame, the second end of each leaf spring being attached to the frame, the leaf springs suspending the frame within the housing;

(d) a plurality of flexures having first and second ends, the first end of each flexure being attached to the frame;

(e) a rotor, the second end of each flexure being attached to the rotor, the flexures suspending the rotor within the frame for torsional oscillation therewithin, the plurality of leaf springs, the frame, the plurality of flexures and the rotor collectively having two resonant frequencies of torsional oscillation;

(f) means for driving the rotor to the higher of the two resonant frequencies of torsional oscillation; and (g) a mirror attached to the rotor for torsional oscillation therewith.

2. The resonant optical scanner defined in claim 1, wherein:

(a) the rotor has an axis of torsional oscillation; and (b) the leaf springs are substantially perpendicular to the axis of torsional oscillation of the rotor.

3. The resonant optical scanner defined in claim 2, wherein:

(a) the rotor has a direction of translation; and (b) the leaf springs are substantially perpendicular to the direction of translation of the rotor.

4. A method of reducing transmission of vibrational forces from a frame of a resonant optical scanner to an optical bed, the resonant optical scanner having a rotor and a plurality of flexures, the method comprising the steps:

(a) providing a housing;

(b) providing a plurality of leaf springs attached to the housing;

(c) suspending, with the leaf springs, the frame of the resonant optical scanner within the housing, the plurality of leaf springs, the frame, the plurality of flexures and the rotor collectively having two resonant frequencies of torsional oscillation;

(d) attaching the housing to the optical bed; and (e) driving the rotor to the higher of the two resonant frequencies of torsional oscillation.

* * * * *